(12) United States Patent
Wei et al.

(10) Patent No.: US 11,958,014 B2
(45) Date of Patent: Apr. 16, 2024

(54) HIGH-FLUX COMPOSITE NANOFILTRATION (NF) MEMBRANE WITH ELECTRICAL DOUBLE LAYER (EDL), AND PREPARATION METHOD AND USE THEREOF

(71) Applicant: Harris Membrane Clean Technology Inc., Alhambra, CA (US)

(72) Inventors: Jiang Wei, Hangzhou (CN); Chulong Chen, Hangzhou (CN); Wei Feng, Hangzhou (CN)

(73) Assignee: HARRIS MEMBRANE CLEAN TECHNOLOGY INC., Alhambra, CA (US)

( * ) Notice: Subject to any disclaimer, the term of this patent is extended or adjusted under 35 U.S.C. 154(b) by 0 days.

(21) Appl. No.: 18/220,916

(22) Filed: Jul. 12, 2023

(65) Prior Publication Data
US 2023/0364559 A1    Nov. 16, 2023

(30) Foreign Application Priority Data

May 12, 2022    (CN) .......................... 202210516560.7

(51) Int. Cl.
*B01D 61/02*    (2006.01)
*B01D 61/08*    (2006.01)
(Continued)

(52) U.S. Cl.
CPC ........... *B01D 61/027* (2013.01); *B01D 61/08* (2013.01); *B01D 67/00111* (2022.08);
(Continued)

(58) Field of Classification Search
None
See application file for complete search history.

(56) References Cited

U.S. PATENT DOCUMENTS

| 5,028,337 A  * | 7/1991 | Linder .................. B01D 71/42 |
| | | 210/655 |
| 2017/0232405 A1 | 8/2017 | Friebe et al. |

FOREIGN PATENT DOCUMENTS

| CN | 104524993 A | 4/2015 |
| CN | 109157991 A | 1/2019 |
| | (Continued) | |

OTHER PUBLICATIONS

Li-Feng Fang, et al., Evaluating the Antifouling Properties of Poly(ether sulfone)/Sulfonated Poly(ether sulfone) Blend Membranes in a Full-Size Membrane Module, Industrial & Engineering Chemistry Research 2018 57 (12), 4430-4441 (Year: 2018).*

(Continued)

*Primary Examiner* — Jason M Greene
*Assistant Examiner* — Eric J McCullough
(74) *Attorney, Agent, or Firm* — Bayramoglu Law Offices LLC

(57) ABSTRACT

A high-flux composite nanofiltration (NF) membrane with an electrical double layer (EDL) and a preparation method thereof are provided. The high-flux composite NF membrane includes: a charged support membrane and a charged separation layer, where a charge carried by the support membrane or the separation layer is a positive charge, a negative charge, or an amphiprotic charge. The high-flux composite NF membrane with an EDL solves the technical problem that the composite NF membrane in the prior art has an unsatisfactory retention rate and a limited application range due to a small charge quantity.

7 Claims, 1 Drawing Sheet

(51) Int. Cl.
     *B01D 67/00*     (2006.01)
     *B01D 69/02*     (2006.01)
     *B01D 69/10*     (2006.01)
     *B01D 71/34*     (2006.01)
     *B01D 71/68*     (2006.01)

(52) U.S. Cl.
     CPC ......... *B01D 67/0013* (2013.01); *B01D 69/02* (2013.01); *B01D 69/105* (2013.01); *B01D 69/1071* (2022.08); *B01D 71/34* (2013.01); *B01D 71/68* (2013.01); *B01D 2323/081* (2022.08); *B01D 2323/12* (2013.01); *B01D 2323/22* (2013.01); *B01D 2325/02833* (2022.08); *B01D 2325/04* (2013.01); *B01D 2325/14* (2013.01); *B01D 2325/26* (2013.01)

(56) References Cited

FOREIGN PATENT DOCUMENTS

| | | |
|---|---|---|
| CN | 110102193 A | 8/2019 |
| CN | 110124538 A | 8/2019 |
| CN | 111974227 A | 11/2020 |
| CN | 112221353 A | 1/2021 |
| KR | 20120021705 A | 3/2012 |

OTHER PUBLICATIONS

Jinli Zhao, et al., Synthesis of cation exchange membranes based on sulfonated polyether sulfone with different sulfonation degrees, Journal of Membrane Science, vol. 563, 2018, pp. 957-968 (Year: 2018).*

* cited by examiner

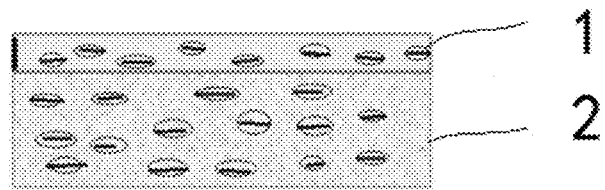

HIGH-FLUX COMPOSITE NANOFILTRATION (NF) MEMBRANE WITH ELECTRICAL DOUBLE LAYER (EDL), AND PREPARATION METHOD AND USE THEREOF

CROSS REFERENCE TO THE RELATED APPLICATIONS

This application is based upon and claims priority to Chinese Patent Application No. 202210516560.7, filed on May 12, 2022, the entire contents of which are incorporated herein by reference.

TECHNICAL FIELD

The present disclosure belongs to the technical field of composite membrane materials, and specifically relates to a high-flux composite nanofiltration (NF) membrane with an electrical double layer (EDL), and a preparation method and use thereof.

BACKGROUND

NF membranes are a group of novel separation membranes that came out in the late 1980s and have a molecular weight cut-off (MWCO) of about 200 MW to 2,000 MW, and an MWCO of an NF membrane is between an MWCO of a reverse osmosis (RO) membrane and an MWCO of a ultrafiltration (UF) membrane. Thus, it is speculated that NF membranes may have a microporous structure of about 1 nm. NF membranes are mostly composite membranes in which a surface separation layer is made of a polyelectrolyte, and thus these NF membranes exhibit a specific retention rate for inorganic salts.

The existing composite NF membranes have a three-layer structure including a non-woven fabric layer, a polysulfone (PSU) support layer, and a polyamide (PA) separation layer, where the PSU support layer is formed on a non-woven fabric through nonsolvent-induced phase separation (NIPS), and does not carry charges; and the PA separation layer is formed through an interfacial polymerization, which usually carries a small number of negative charges and carries positive charges at a low pH.

The retention of a salt ion by an NF membrane is implemented by a charging effect, and an electrostatic interaction between the salt ion and a charge carried by the NF membrane hinders the penetration of a polyvalent ion, which is an important reason why the NF membrane still has a high desalination performance under a low pressure. Since charge quantities of a divalent ion and a high-valent ion are larger than a charge quantity of a monovalent ion, NF membranes generally exhibit a higher retention rate for divalent and high-valent salts than for monovalent salts. Because a PSU support layer does not carry charges and a PA separation layer carries a small number of negative charges at a high pH, a total charge quantity of the composite NF membrane in the prior art is limited, which is not conducive to improvement of retention performance. In addition, the existing commercial composite NF membrane has a thickness of about 130 μm to 150 μm, and a flux of the membrane still needs to be improved.

Chinese patent application No. CN110102193A discloses a preparation method of an RO or NF membrane with porous polyolefin (PO) as a support membrane, and the preparation method is specifically as follows: porous PO is taken as a support membrane, a surface of the support membrane is subjected to a hydrophilic modification through coating, and then a modified support membrane is subjected to an interfacial polymerization to obtain the RO or NF membrane. The support membrane has a thickness of 12 μm to 60 μm, and polyethylene (PE) is used instead of expensive non-woven fabrics and PSU, which greatly reduces a cost of raw materials. In addition, compared with a commercial RO/NF membrane, the RO or NF membrane obtained in this patent can have a thickness reduced by 80%. In the preparation method of this patent, porous PO is used as a support membrane instead of the non-woven fabric and PSU used in the prior art, and the porous PO is subjected to hydrophilic modification, which can reduce a thickness of the membrane without affecting a flux of the membrane. In this patent, a substitute that does not affect the performance of the existing composite NF membrane is provided for raw materials, but the performance of the existing composite NF membrane cannot be improved, especially, a retention rate and a water flux of the membrane cannot be significantly improved.

Chinese patent application No. CN110124538A discloses a preparation method of a self-healing separation membrane with an EDL on a surface, and the preparation method is specifically as follows: a negatively-charged two-component polymer and a positively-charged two-component polymer are first synthesized separately; and then through an adhesion of polydopamine (PDA) or tannic acid, the negatively-charged two-component polymer is grafted to a surface of a separation membrane and then the positively-charged two-component polymer is grafted to the separation membrane to obtain the self-healing separation membrane with an EDL on a surface. In this patent, the surface functionality is provided by the negatively-charged polymer in the sub-outer layer; and due to an electrostatic interaction between the positively-charged polymer in the outermost layer and the negatively-charged polymer in the sub-outer layer, when micro-gaps appear on a surface of the separation membrane due to micro-damage, an adjacent polymer provides compensation charges to repair the micro-gaps in time, which can improve the stability of the functional layer on the surface of the separation membrane. In this patent, although a total charge quantity is increased, a thickness of the membrane is not improved, and a water flux of the membrane still needs to be improved.

Chinese patent application No. CN112221353A discloses a polyelectrolyte complex (PEC) NF membrane and a preparation method and use thereof, and specifically, the preparation method includes the following steps: 1) a polymer solution is prepared; 2) a polyanionic electrolyte is added to the polymer solution, and after the polyanionic electrolyte is dissolved, a resulting solution is allowed to stand for bubble removal to obtain a coating solution; 3) a polycationic electrolyte solution is prepared; 4) the coating solution is applied to a non-woven fabric, and then the non-woven fabric is soaked in deionized water for curing to obtain an NF support membrane; and 5) the polycationic electrolyte solution is applied to the NF support membrane, a reaction is conducted, and after the reaction is completed, a resulting membrane is soaked in a glycerol aqueous solution and then subjected to a high-temperature heat treatment to obtain the PEC NF membrane. In the above technical solution, a polyanionic electrolyte is introduced into a film-forming material of an NF support membrane, and then a polycationic electrolyte is combined with a negatively-charged group on a surface of the support membrane to produce a polyelectrolyte NF membrane with a dense and ultra-thin selective separation layer having an "ion pair" structure. In the preparation method of this patent, improvement is conducted based on the traditional layer-by-layer (LbL) self-assembly process, which avoids the cumbersome traditional LbL self-assembly process, reduces a thickness of the membrane, and increases a flux of the membrane. However, this patent is still based on a three-layer structure of the traditional composite NF membrane, namely, a three-layer structure including a non-woven fabric, a support membrane, and a separation layer; and it can be known that there is still a great improvement potential for the overall thickness, water flux, and ion retention rate of the composite NF membrane.

SUMMARY

In view of this, the present disclosure provides a high-flux composite NF membrane with an EDL, and a preparation method and use thereof. The present disclosure solves the problem that the composite NF membrane in the prior art has an unsatisfactory retention rate and a limited application range due to a small charge quantity.

A first technical solution of the present disclosure is as follows: A high-flux composite NF membrane with an EDL is provided, including: a charged support membrane and a charged separation layer, where a charge carried by the support membrane or the separation layer is a positive charge, a negative charge, or an amphiprotic charge.

Preferably, the support membrane has a strongly negatively-charged sulfonic acid group, or a weakly negatively-charged carboxylic acid group and phosphate group, or a strongly positively-charged quaternary ammonium group, or a weakly positively-charged primary, secondary, and/or tertiary amine group, or an amphiprotic group.

Preferably, the separation layer has a strongly negatively-charged sulfonic acid group, or a weakly negatively-charged carboxylic acid group and phosphate group, or a strongly positively-charged quaternary ammonium group, or a weakly positively-charged primary, secondary, and/or tertiary amine group, or an amphiprotic group.

Preferably, a material of the support membrane is selected from the group consisting of polysulfone (PSU), polyethersulfone (PES), polyvinyl chloride (PVC), polyacrylonitrile (PAN), polyimide (PI), polyetherimide (PEI), polyvinylidene fluoride (PVDF), cellulose, polypropylene (PP), and polyethylene (PE).

Preferably, the support membrane has a thickness of 10 μm to 200 μm and a pore size of 15 nm to 80 nm.

Preferably, the separation layer has a thickness of 10 nm to 10 μm.

A second technical solution of the present disclosure is as follows: A preparation method of a high-flux composite NF membrane with an EDL is provided, including the following two steps:
(1) preparation of a support membrane: preparing a charged support membrane through an NIPS, thermally induced phase separation (TIPS), dry stretching/wet stretching, or supercritical carbon dioxide (SCD) technique; and
(2) preparing a charged separation layer on a surface of the support membrane through coating or interfacial polymerization or a crosslinking reaction.

Preferably, a charge of the support membrane is introduced by blending an ionomer or a grafting reaction.

Preferably, the support membrane and the separation layer each have a strongly negatively-charged sulfonic acid group, or a weakly negatively-charged carboxylic acid group and phosphate group, or a strongly positively-charged quaternary ammonium group, or a weakly positively-charged primary, secondary, and tertiary amine group, or an amphiprotic group.

A third technical solution of the present disclosure is as follows: A use of the high-flux composite NF membrane with an EDL described above in a household faucet water filter, a water work, reclaimed water reuse, and treatment of rural drinking water is provided.

Beneficial Effects:

The present disclosure provides a high-flux composite NF membrane with an EDL, including: a charged support membrane and a charged separation layer, where a charge carried by the support membrane or the separation layer can be a positive charge, a negative charge, or an amphiprotic charge; and a charge carried by the support membrane and a charge carried by the separation layer may be the same, which can increase a charge quantity of the composite membrane to allow improvement of a retention rate.

The present disclosure provides a preparation method of a high-flux composite NF membrane with an EDL, including the following two steps: step 1: with a film-forming technique such as NIPS, TIPS, dry stretching/wet stretching, or SCD, a support membrane is prepared by blending an ionomer with a positive charge, negative charge, or amphiprotic charge, or a support membrane is prepared from a polymer with a positive charge, a negative charge, or an amphiprotic charge produced through a grafting reaction, such that the support membrane carries a charge; and step 2: a separation layer with a positive charge, negative charge, or amphiprotic charge is formed on a surface of the support membrane through coating or interfacial polymerization or a crosslinking reaction. The composite NF membrane prepared by the preparation method of the present disclosure has a large charge quantity, a small thickness, a high retention rate, and a high water flux.

The high-flux composite NF membrane with an EDL of the present disclosure is based on an EDL structure formed by a charged support membrane and a charged separation layer and does not include a non-woven fabric layer, and thus the composite NF membrane can be applied to a household faucet water filter, a water work, and reclaimed water reuse, and can also be applied to treatment of rural drinking water. The existing household faucet water filters mostly adopt a microfiltration (MF) or UF membrane product, and rarely adopt an NF membrane. If an NF membrane is adopted, a pump needs to be added; and if a pump is not added, an NF membrane product with a large area needs to be assembled to allow a flux. The NF membrane of the present disclosure can be used without a pump, and the NF membrane with a small area can allow a high flux, high efficiency, and energy conservation under a low pressure.

BRIEF DESCRIPTION OF THE DRAWINGS

To make the content of the present disclosure comprehensible and clear, the present disclosure is described in further detail below with reference to the specific examples and accompanying drawings of the present disclosure.

FIGURE is a schematic diagram of the composite NF membrane with an EDL in the present disclosure.

In this FIGURE: 1: separation layer; and 2: support membrane.

DETAILED DESCRIPTION OF THE EMBODIMENTS

In order to describe the technical contents, objectives, and effects of the present disclosure in detail, the present disclosure is described below with reference to implementations.

Unless otherwise specified, the reagents used in the specification are commercially available.

As shown in the FIGURE, the present disclosure provides a composite NF membrane with an EDL, including: charged support membrane 2 and charged separation layer 1, where a charge carried by the support membrane or the separation layer is a positive charge, a negative charge, or an amphiprotic charge. For example, the composite NF membrane with an EDL includes a positively-charged support membrane and a positively-charged separation layer; or includes a negatively-charged support membrane and a positively-charged separation layer; or includes a positively-charged and negatively-charged support membrane and a positively-charged separation layer; or includes a positively-charged support membrane and a negatively-charged separation layer; or includes a negatively-charged support membrane and a negatively-charged separation layer; or includes a positively-charged and negatively-charged support membrane and a negatively-charged separation layer; or includes a positively-charged support membrane and a positively-charged and negatively-charged separation layer; or includes a negatively-charged support membrane and a positively-charged and negatively-charged separation layer; or includes a positively-charged and negatively-charged support membrane and a positively-charged and negatively-charged separation layer.

Specifically, the support membrane can have a strongly negatively-charged sulfonic acid group, or a weakly negatively-charged carboxylic acid group and phosphate group, or a strongly positively-charged quaternary ammonium group, or a weakly positively-charged primary, secondary, and/or tertiary amine group, or a positively-charged and negatively-charged amphiprotic group. The separation layer can have a strongly negatively-charged sulfonic acid group, or a weakly negatively-charged carboxylic acid group and phosphate group, or a strongly positively-charged quaternary ammonium group, or a weakly positively-charged primary, secondary, and/or tertiary amine group, or a positively-charged and negatively-charged amphiprotic group.

A material of the support membrane is selected from the group consisting of PSU, PES, PVC, PAN, PI, PEI, PVDF, cellulose, PP, and PE. The composite NF membrane of the present disclosure can include a non-woven fabric layer, and a non-woven fabric material is selected from the group consisting of traditional PP, PE, polyethylene terephthalate (PET), and derivatives thereof; and when including a non-woven fabric layer, the NF membrane with an EDL of the present disclosure can be applied to separation of an organic matter from a salt. Because the EDL structure formed by a charged support membrane and a charged separation layer can completely replace a non-woven fabric layer, the composite NF membrane of the present disclosure preferably does not include a non-woven fabric; and the composite NF membrane without a non-woven fabric layer of the present disclosure exhibits better performance than the traditional composite NF membrane with a non-woven fabric layer. The increased charge quantity can significantly improve the retention performance; and the absence of a non-woven fabric can significantly reduce a thickness of the membrane and reduce the water resistance, thereby increasing a water flux. The composite NF membrane of the present disclosure can be applied to a household faucet water filter, a water work, and reclaimed water reuse, and can also be applied to treatment of rural drinking water.

In the composite NF membrane of the present disclosure, the support membrane has a thickness of 10 μm to 200 μm, preferably 10 μm to 100 μm, and further preferably 65 μm to 100 μm and a pore size of 15 nm to 80 nm and preferably 65 nm to 80 nm; and the separation layer has a thickness of 10 nm to 10 μm and preferably 20 nm to 1 μm.

Further, parameters such as charge quantities, pore sizes, and thicknesses of the support membrane and the separation layer can be adjusted according to performance requirements of an actual NF membrane product. For example, a charge quantity of the support membrane or the separation layer can be adjusted by blending an ionomer in different percentages, and if a positively-charged polymer or a negatively-charged polymer or a positively-charged and negatively-charged polymer produced through a grafting reaction is introduced into the support membrane or the separation layer, parameters such as time and temperature of the grafting reaction are controlled to allow adjustment.

The present disclosure also provides a preparation method of a composite NF membrane with an EDL, including the following two steps:

(1) Preparation of a support membrane: A charged support membrane is prepared through an NIPS, TIPS, dry stretching/wet stretching, or SCD technique, where a positively-charged ionomer or a negatively-charged ionomer or a positively-charged and negatively-charged ionomer is introduced into a support membrane through blending, or a positively-charged polymer or a negatively-charged polymer or a positively-charged and negatively-charged polymer produced through a grafting reaction is introduced into a support membrane, such that the support membrane is charged.

(2) A charged separation layer is prepared on a surface of the support membrane through coating or interfacial polymerization or a crosslinking reaction.

The composite NF membrane of the present disclosure includes a flat NF membrane, a hollow fiber NF membrane, a tubular NF membrane, a pleated filter cartridge, and a coiled membrane.

A retention rate of the NF membrane is mainly determined by factors such as molecular size and charge quantity, and a main feature of the composite NF membrane with an EDL of the present disclosure is as follows: an electrostatic interaction between the membrane and a salt ion is strengthened by significantly increasing a charge quantity to hinder the passage of a polyvalent ion. The composite NF membrane with an EDL of the present disclosure has a slightly-larger pore size than the existing NF membrane, which allows a high flux.

Example 1

In this example, a composite NF membrane with an EDL was provided, in which both a support membrane and a separation layer were strongly negatively-charged.

A preparation method of a PVDF support membrane was as follows:

Step 1: 10.5% (mass fraction) of PVDF, 7.5% (mass fraction) of sulfonated PVDF (sulfonation degree: 51.9%), and 82% (mass fraction) of caprolactam were heated in a 135° C. oil bath under nitrogen protection until the caprolactam, PVDF, and sulfonated PVDF were completely melted, and then allowed to stand in the oil bath for 1 h.

Step 2: A casting solution obtained in step 1 was coated and formed on a steel plate of a coating machine, and then immediately placed in 25° C. water to extract caprolactam for 15 h to obtain a strongly negatively-charged PVDF support membrane with a thickness of 76 μm and a pore size of 65 nm.

A preparation method of a sulfonated PVDF separation layer was as follows:

5.5% (mass fraction) of sulfonated PVDF was dissolved in a mixed solvent of ethylene glycol monomethyl ether (EGME) and N-methylpyrrolidone (NMP), a resulting solution was filtered through filter paper with a pore size of 10 μm to remove insoluble matters, and a resulting filtrate was then coated on the PVDF support membrane and heated at 80° C. for 30 min to obtain the composite NF membrane.

The composite NF membrane was subjected to a zeta potential test, where a zeta potential of the composite NF membrane in each of solutions respectively with pH values of 1, 3, 5, 7, 9, 11, and 13 was determined, and determination results were shown in the table below. The results showed that a surface of the membrane was strongly negatively-charged.

| pH | zeta potential |
| --- | --- |
| 1 | −75.5 mV |
| 3 | −73.6 mV |
| 5 | −74.7 mV |
| 7 | −77.1 mV |
| 9 | −76.3 mV |
| 11 | −76.5 mV |
| 13 | −73.9 mV |

In contrast, it was tested that a zeta potential of a commercial NF membrane varied with a pH, the commercial NF membrane was positively-charged at a low pH (such as pH 1) and was negatively-charged at a high pH (such as pH 4 or higher), and a minimum zeta potential of the commercial NF membrane was about −30 mV. It can be seen that a zeta potential of the composite NF membrane in this example does not change with a change of a pH, and is much smaller than a zeta potential of the commercial NF membrane, indicating that, when both the support membrane and the separation layer are negatively-charged, it is conducive to preparation of a strongly negatively-charged composite NF membrane.

The composite NF membrane in this example has a retention rate of 95.6% for $MgSO_4$ and a water flux of 317 LMH, and measurement conditions are as follows: 2,000 ppm $MgSO_4$, 10 bar. It indicates that the composite NF membrane has high salt retention performance and exhibits a high water flux.

Use of the NF Membrane of this Example in a Household Faucet Water Filter

The existing household faucet water filters mostly adopt an MF or UF membrane product, and rarely adopt an NF membrane. This is because the existing NF membranes require a pressure at least of 3 kg/m² to operate and a tap water pressure is generally lower than the required pressure. When the NF membrane with an EDL of the present disclosure is used, there is no need to add a pump, and only a low pressure of tap water itself is relied. The NF membrane prepared in Example 1 was compared with MF and UF membrane products used for a household faucet water filter. The heavy metal lead, norovirus, and *Escherichia coli* (*E. coli*) were deliberately added to tap water to be treated, and then effects of the three membranes to remove the harmful substances in water were tested. Test results were shown in Table 1 below.

TABLE 1

Comparison of use of the NF membrane in Example 1 and the MF and UF membrane products in a household faucet water filter

| | Example 1 | MF | UF |
| --- | --- | --- | --- |
| Operating pressure | 0.1 MPa | 0.1 MPa | 0.1 MPa |
| Water flux (LMH) | 59 | 201 | 92 |
| Retention rate for monovalent salts | 16.0% | 0% | 0% |
| Retention rate for the heavy metal lead | 100% | 1% | 3% |
| Retention rate for the virus | 100% | 9% | 31% |
| Retention rate for the *E. coli* | 100% | 92% | 97% |

The results show that the NF membrane with an EDL produced by the present disclosure can operate under a pressure of 1 kg/m², and exhibits a very low retention rate for the monovalent salts, and the monovalent salts are trace mineral salts required by the human body; the NF membrane with an EDL produced by the present disclosure can completely intercept the heavy metal, virus, and bacterium, and in contrast, the MF and UF membranes show unsatisfactory retention rates for the heavy metal, virus, and bacterium; and a water production of each of the MF and UF membranes is greater than a water production of the NF membrane of the present disclosure. However, the water production of the NF membrane of the present disclosure can meet the requirements of a household faucet water filter. Therefore, the NF membrane of the present disclosure can be used instead of an MF or UF membrane for a household faucet without a pump, and the NF membrane of the present disclosure can remove the heavy metal, virus, and bacterium in water to allow safe water use, which is an outstanding advantage of the NF membrane.

Example 2

In this example, a composite NF membrane with an EDL was provided, in which both a support membrane and a separation layer were strongly positively-charged.

A preparation method of a PSU support membrane was as follows:
  Step 1: 11.7% (mass fraction) of PSU and 7.3% (mass fraction) of quaternary aminated PSU were dissolved in 81.0% (mass fraction) of N,N-dimethylformamide (DMF) at 65° C., and after the compounds were fully dissolved, a resulting solution was allowed to stand for 5 h to allow bubble removal.
  Step 2: A casting solution obtained in step 1 was coated on a non-woven fabric, and a film was formed through NIPS in 15° C. water to obtain a strongly positively-charged PSU support membrane with a thickness of 152 μm and a pore size of 38 nm.

A preparation method of a quaternary aminated PSU separation layer was as follows:

3.5% of quaternary aminated PSU was dissolved in a mixed solvent of EGME and DMF, a resulting solution was filtered through filter paper with a pore size of 10 μm to remove insoluble matters, and a resulting filtrate was then coated on the PSU support membrane and heated at 90° C. for 25 min to obtain the composite NF membrane.

The composite NF membrane in this example was subjected to a zeta potential test, where a zeta potential of the composite NF membrane in each of solutions respectively with pH values of 1, 3, 5, 7, 9, 11, and 13 was determined. Measurement results show that a zeta potential of the composite NF membrane in this example does not change with a change of a pH and is about +81 mV; and in contrast, the positively-charged composite NF membrane in the prior art has a zeta potential generally of less than +30 mV, indicating that, when both the support membrane and the separation layer are positively-charged, it is conducive to preparation of a strongly positively-charged composite NF membrane.

The composite NF membrane in this example has a retention rate of 94.8% for $MgCl_2$ and a water flux of 209 LMH, and measurement conditions are as follows: 2,000 ppm $MgCl_2$, 10 bar. In contrast, the commercial NF membrane NF270 in the prior art has a retention rate only of 48% for $MgCl_2$ under the same conditions. Therefore, the composite NF membrane in this example has high salt retention performance and exhibits a high water flux.

Example 3

In this example, a composite NF membrane with an EDL was provided, in which both a support membrane and a separation layer were strongly negatively-charged.

A preparation method of a PVDF support membrane was as follows:
Step 1: 9.2% (mass fraction) of PVDF and 9.3% (mass fraction) of sulfonated PVDF (sulfonation degree: 51.9%) were dissolved in 81.5% (mass fraction) of NMP at 65° C., and after the compounds were fully dissolved, a resulting solution was allowed to stand for 5 h to allow bubble removal.
Step 2: A casting solution obtained in step 1 was coated on a non-woven fabric, and a film was formed through NIPS in 15° C. water to obtain a strongly negatively-charged PVDF support membrane with a thickness of 139 μm and a pore size of 47 nm.

A preparation method of a sulfonated PES separation layer was as follows:
2.5% of sulfonated PES (sulfonation degree: 31.6%) was dissolved in a mixed solvent of EGME and NMP, a resulting solution was filtered through filter paper with a pore size of 10 μm to remove insoluble matters, and a resulting filtrate was then coated on the PVDF support membrane and heated at 90° C. for 25 min to obtain the composite NF membrane.

The composite NF membrane in this example was subjected to a zeta potential test, where a zeta potential of the composite NF membrane in each of solutions respectively with pH values of 1, 3, 5, 7, 9, 11, and 13 was determined. Measurement results show that a zeta potential of the composite NF membrane in this example does not change with a change of a pH and is about −67 mV, indicating that, when both the support membrane and the separation layer are negatively-charged, it is conducive to preparation of a strongly negatively-charged composite NF membrane.

The composite NF membrane in this example has a retention rate of 92.2% for $MgSO_4$ and a water flux of 217 LMH, and measurement conditions are as follows: 2,000 ppm $MgSO_4$, 10 bar. It indicates that the composite NF membrane has high salt retention performance and exhibits a high water flux.

Example 4

In this example, a composite NF membrane with an EDL was provided, in which both a support membrane and a separation layer were strongly negatively-charged.

A preparation method of a PE stretched support membrane was as follows:

46% (mass fraction) of a PE powder with a molecular weight of 3,620,000, 6% (mass fraction) of sulfonated chlorinated polypropylene (CPP) with a molecular weight of 1,870,000, and 48% (mass fraction) of mineral oil were added to a stainless-steel reactor with a stirrer, and stirred for 10 min to obtain a uniformly-dispersed suspension. The suspension was added to a twin-screw extruder with a screw aspect ratio of 48, and subjected to melt-extrusion at 150° C. to 250° C.

A resulting mixture was filtered through a 300-mesh filter to obtain a PE composition, and the PE composition was extruded with a T-type die through a melt pump and then quenched in a cold water bath to obtain a jelly-like membrane sheet; and the membrane sheet was stretched longitudinally and horizontally in sequence at 115° C. with a biaxial stretching ratio of 8×5, and a stretched membrane was subjected to extraction with acetone, dried with hot air, and heat-set at 120° C. for 15 s to obtain a PE support membrane with a thickness of 73 μm and a pore size of 95 nm.

A method for preparing a separation layer through interfacial polymerization was as follows:
The PE support membrane was soaked in a sulfonated PDA aqueous solution with a mass fraction of 1.2% (Tris-HCl buffer, pH 8.5) for 5 min, then cleaned with water, and dried in air. The support membrane was then soaked in a solution of 0.3% trimesoyl chloride (TMC) in hexane for 3 min to allow interfacial polymerization, and a resulting membrane was finally heated at 80° C. for 10 min to obtain a composite NF membrane.

The composite NF membrane in this example was subjected to a zeta potential test, where a zeta potential of the composite NF membrane in each of solutions respectively with pH values of 1, 3, 5, 7, 9, 11, and 13 was determined. Measurement results show that a zeta potential of the composite NF membrane in this example does not change with a change of a pH and is about −58 mV; and a zeta potential of the commercial NF membrane varies with a pH, and a minimum zeta potential of the commercial NF membrane is generally about −30 m, indicating that, when both the support membrane and the separation layer are negatively-charged, it is conducive to preparation of a strongly negatively-charged composite NF membrane through interfacial polymerization.

The composite NF membrane in this example has a retention rate of 99.3% for $MgSO_4$ and a water flux of 367 LMH, and measurement conditions are as follows: 2,000 ppm $MgSO_4$, 10 bar. The separation layer of the composite NF membrane in this example is formed through interfacial polymerization, and a surface of the membrane is strongly negatively-charged, such that the composite NF membrane exhibits excellent salt retention performance. In addition, this composite NF membrane does not include a non-woven fabric, and thus exhibits a high water flux.

A PE stretched membrane is usually hydrophobic, and cannot be directly used as a support membrane for interfacial polymerization. In this example, sulfonated PP is introduced into the support membrane, such that the support membrane is hydrophilic and interfacial polymerization is allowed on a surface of the support membrane.

In summary, the embodiments of the present disclosure fully indicate the advantages of the combination of a strongly charged support membrane and a strongly charged separation layer, namely, EDL, which allows preparation of a composite membrane with excellent performance. The composite membrane of the present disclosure can be strongly positively-charged, or strongly negatively-charged, or both positively-charged and negatively-charged. According to requirements of separation of different salt molecules, composite NF membranes with different properties can be prepared.

Apparently, the above examples are merely listed for clear description, and are not intended to limit the implementations. Those of ordinary skill in the art may make modifications or variations in other forms based on the above description. There are no need and no way to exhaust all of the implementations. Obvious changes or variations made thereto shall still fall within the protection scope of the present disclosure.

What is claimed is:

1. A composite nanofiltration (NF) membrane with an electrical double layer (EDL), wherein the NF membrane with the EDL is formed by a support membrane having a negatively-charged sulfonic acid group and a separation layer having a negatively-charged sulfonic acid group; wherein
the support membrane is formed on a non-woven fabric by a casting solution that is formed by mixing polyvinylidene fluoride (PVDF) and sulfonated PVDF, such that the support membrane is negatively-charged, wherein a sulfonation degree of the sulfonated PVDF is 51.9%;
the separation layer is formed by coating sulfonated polyethersulfone (PES) on a surface of the support membrane and is negatively-charged, wherein a sulfonation degree of the sulfonated PES is 31.6%,
the zeta potential of the surface of the composite NF membrane is in a range from −73.6 mV to −77.1 mV at a pH from 1 to 13, the zeta potential is −75.5 mV at pH 1, the zeta potential is −73.6 mV at pH 3, the zeta potential is −74.7 mV at pH 5, the zeta potential is −77.1 mV at pH 7, the zeta potential is −76.3 mV at pH 9, the zeta potential is −76.5 mV at pH 11, the zeta potential is −73.9 mV at pH 13, wherein the water flux is 59 LMH at an operating pressure of 0.1 MPa.

2. The composite NF membrane with the EDL according to claim 1, wherein a preparation method of the negatively-charged support membrane comprises:
step 1: dissolving 9.2% (mass fraction) of the PVDF and 9.3% (mass fraction) of the sulfonated PVDF in 81.5% (mass fraction) of N-methylpyrrolidone (NMP) at 65° C., and after the compounds are fully dissolved, allowing a resulting solution to stand for 5 h to allow bubble removal; and
step 2: coating the casting solution obtained in step 1 on the non-woven fabric, and forming a film through nonsolvent-induced phase separation (NIPS) in 15° C. water to obtain the negatively-charged support membrane.

3. The composite NF membrane with the EDL according to claim 2, wherein the support membrane has a thickness of 10 μm to 200 μm and a pore size of 15 nm to 80 nm.

4. The composite NF membrane with the EDL according to claim 1, wherein a preparation method of the sulfonated PES separation layer comprises:
dissolving 2.5% of the sulfonated PES in a mixed solvent of ethylene glycol monomethyl ether (EGME) and N-methylpyrrolidone (NMP), filtering a resulting solution through a filter paper with a pore size of 10 μm to remove insoluble matters, then coating a resulting filtrate on the support membrane and heating at 90° C. for 25 min to obtain the composite NF membrane.

5. The composite NF membrane with the EDL according to claim 4, wherein the separation layer has a thickness of 10 nm to 10 μm.

6. The composite NF membrane with the EDL according to claim 2, wherein a preparation method of the sulfonated PES separation layer comprises:
dissolving 2.5% of the sulfonated PES in a mixed solvent of ethylene glycol monomethyl ether (EGME) and the NMP, filtering a resulting solution through a filter paper with a pore size of 10 μm to remove insoluble matters, then coating a resulting filtrate on the support membrane and heating at 90° C. for 25 min to obtain the composite NF membrane.

7. The composite NF membrane with the EDL according to claim 6, wherein the separation layer has a thickness of 10 nm to 10 μm.

* * * * *